US011351653B2

(12) United States Patent
Nienaber et al.

(10) Patent No.: US 11,351,653 B2
(45) Date of Patent: *Jun. 7, 2022

(54) NONWOVEN ABRASIVE ARTICLES HAVING ELECTROSTATICALLY-ORIENTED ABRASIVE PARTICLES AND METHODS OF MAKING SAME

(71) Applicant: 3M INNOVATIVE PROPERTIES COMPANY, St. Paul, MN (US)

(72) Inventors: Aaron K. Nienaber, Maplewood, MN (US); Grayce T. Huberty, St. Paul, MN (US); Thomas J. Nelson, Woodbury, MN (US); Ronald D. Apple, Apple Valley, CA (US); Louis S. Moren, Oakdale, MN (US); Robinette S. Alkhas, Winnetka, CA (US); Nathan E. Schultz, Woodbury, MN (US); Tien T. Wu, Woodbury, MN (US); Gerry A. Hoffdahl, Scandia, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 520 days.

This patent is subject to a terminal disclaimer.

(21) Appl. No.: 16/336,157

(22) PCT Filed: Sep. 18, 2017

(86) PCT No.: PCT/US2017/052078
§ 371 (c)(1),
(2) Date: Mar. 25, 2019

(87) PCT Pub. No.: WO2018/057465
PCT Pub. Date: Mar. 29, 2018

(65) Prior Publication Data
US 2021/0283749 A1    Sep. 16, 2021

Related U.S. Application Data

(60) Provisional application No. 62/399,618, filed on Sep. 26, 2016.

(51) Int. Cl.
*B24D 11/00*    (2006.01)
*B05D 1/00*    (2006.01)
*C09K 3/14*    (2006.01)

(52) U.S. Cl.
CPC .............. *B24D 11/00* (2013.01); *B05D 1/007* (2013.01); *B24D 11/005* (2013.01); *C09K 3/1409* (2013.01)

(58) Field of Classification Search
CPC ...... B24D 11/00; B24D 11/005; B05D 1/007; C09K 3/1409
See application file for complete search history.

(56) References Cited

U.S. PATENT DOCUMENTS 1,910,444 A    5/1933  Nicholson
2,307,698 A *  1/1943  Melton ................ B24D 11/005
                                                    51/294

(Continued)

FOREIGN PATENT DOCUMENTS

CN         202964430      6/2013
WO    WO 2004-096494    11/2004

(Continued)

OTHER PUBLICATIONS

International Search report for PCT International Application No. PCT/US2017/052078 dated Jan. 31, 2018, 5 pages.

*Primary Examiner* — Pegah Parvini
*Assistant Examiner* — Ross J Christie
(74) *Attorney, Agent, or Firm* — Katherine M. Scholz

(57) ABSTRACT

Abrasive articles including a nonwoven fibrous substrate having a plurality of fibers, and a multiplicity of shaped abrasive particles, each shaped abrasive particle adhered to a corresponding fiber, each shaped abrasive particle having a length (L) and a width (W) determined in a direction substantially orthogonal to the length, the ratio of the length to the width defining an aspect ratio (L/W) of at least 1.1, (Continued)

each abrasive particle is oriented relative to its corresponding fiber, and more than 50% of the abrasive particles are oriented with respect to their corresponding fiber such that the abrasive particle length extends generally outwardly away from a surface of the corresponding fiber as determined visually using the Orientation Test. The shaped abrasive particles may have the geometric shape of a polygonal prism having two faces and at least three sides thereon. Methods of making the abrasive articles are also disclosed.

14 Claims, 4 Drawing Sheets

(56) References Cited

U.S. PATENT DOCUMENTS

| | | | |
|---|---|---|---|
| 3,041,156 A | 6/1962 | Rowse | |
| 4,314,827 A | 2/1982 | Leitheiser | |
| 4,418,120 A | 11/1983 | Kealy | |
| 4,588,419 A | 5/1986 | Caul | |
| 4,623,364 A | 11/1986 | Cottringer | |
| 4,652,275 A | 3/1987 | Bloecher | |
| 4,734,104 A | 3/1988 | Broberg | |
| 4,737,163 A | 4/1988 | Larkey | |
| 4,744,802 A | 5/1988 | Schwabel | |
| 4,751,138 A | 6/1988 | Tumey | |
| 4,770,671 A | 9/1988 | Monroe | |
| 4,799,939 A | 1/1989 | Bloecher | |
| 4,881,951 A | 11/1989 | Wood | |
| 4,997,461 A | 3/1991 | Markhoff-Matheny | |
| 5,009,675 A | 4/1991 | Kunz | |
| 5,011,508 A | 4/1991 | Wald | |
| 5,042,991 A | 8/1991 | Kunz | |
| 5,085,671 A | 2/1992 | Martin | |
| 5,152,917 A | 10/1992 | Pieper | |
| 5,201,916 A | 4/1993 | Berg | |
| 5,203,884 A | 4/1993 | Buchanan | |
| 5,213,591 A | 5/1993 | Celikkaya | |
| 5,352,254 A | 10/1994 | Celikkaya | |
| 5,366,523 A * | 11/1994 | Rowenhorst | B24D 3/14 51/293 |
| 5,378,251 A | 1/1995 | Culler | |
| 5,435,816 A | 7/1995 | Spurgeon | |
| 5,436,063 A | 7/1995 | Follett | |
| 5,496,386 A | 3/1996 | Broberg | |
| 5,520,711 A | 5/1996 | Helmin | |
| 5,609,706 A | 3/1997 | Benedict | |
| 5,672,097 A | 9/1997 | Hoopman | |
| 5,695,533 A | 12/1997 | Kardys | |
| 5,946,991 A | 9/1999 | Hoopman | |
| 5,961,674 A | 10/1999 | Gagliardi | |
| 5,975,987 A | 11/1999 | Hoopman | |
| 5,975,988 A | 11/1999 | Christianson | |
| 5,984,988 A | 11/1999 | Berg | |
| 6,017,831 A * | 1/2000 | Beardsley | B24D 3/28 442/148 |
| 6,057,256 A | 5/2000 | Krueger | |
| 6,129,540 A | 10/2000 | Hoopman | |
| 6,492,286 B1 | 12/2002 | Berrigan | |
| 6,607,624 B2 | 8/2003 | Berrigan | |
| 6,824,372 B2 | 11/2004 | Berrigan | |
| 6,916,752 B2 | 7/2005 | Berrigan | |
| 7,279,440 B2 | 10/2007 | Berrigan | |
| 7,695,660 B2 | 4/2010 | Berrigan | |
| 8,034,137 B2 | 10/2011 | Erickson | |
| 8,142,531 B2 | 3/2012 | Adefris | |
| 8,142,532 B2 | 3/2012 | Erickson | |
| 8,142,891 B2 | 3/2012 | Culler | |
| 8,764,865 B2 | 7/2014 | Boden | |
| 8,771,801 B2 | 7/2014 | Moren | |
| 8,802,002 B2 | 8/2014 | Berrigan | |
| 8,845,773 B2 | 9/2014 | Erickson | |
| 8,869,740 B2 | 10/2014 | Moren | |
| 8,894,466 B2 | 11/2014 | Jungbauer | |
| 9,039,797 B2 | 5/2015 | Erickson | |
| 9,139,940 B2 | 9/2015 | Berrigan | |
| 9,194,065 B2 | 11/2015 | Berrigan | |
| 9,248,951 B2 | 2/2016 | Greer, Jr. | |
| 9,416,485 B2 | 8/2016 | Moore | |
| 9,422,653 B2 | 8/2016 | Wu | |
| 9,849,563 B2 * | 12/2017 | Thurber | B24D 3/002 |
| 2009/0165394 A1 | 7/2009 | Culler | |
| 2009/0169816 A1 | 7/2009 | Erickson | |
| 2011/0289854 A1* | 12/2011 | Moren | B24D 11/001 51/295 |
| 2012/0094562 A1 | 4/2012 | Martin Rivera | |
| 2012/0227333 A1 | 9/2012 | Adefris | |
| 2013/0030340 A1 | 1/2013 | Vincent | |
| 2013/0040537 A1 | 2/2013 | Schwabel | |
| 2013/0101805 A1 | 4/2013 | Altshuler | |
| 2013/0125477 A1 | 5/2013 | Adefris | |
| 2014/0170362 A1 | 6/2014 | Ali | |

FOREIGN PATENT DOCUMENTS

| | | | |
|---|---|---|---|
| WO | WO 2005-102606 | 11/2005 | |
| WO | WO 2014-137972 | 9/2014 | |
| WO | WO-2014137972 A1 * | 9/2014 | B24D 11/00 |
| WO | WO 2016-167967 | 10/2016 | |

* cited by examiner

NONWOVEN ABRASIVE ARTICLES HAVING ELECTROSTATICALLY-ORIENTED ABRASIVE PARTICLES AND METHODS OF MAKING SAME

CROSS REFERENCE TO RELATED APPLICATIONS

This application is a national stage filing under 35 U.S.C. 371 of PCT/US2017/052078, filed Sep. 18, 2017, which claims the benefit of U.S. Provisional Application No. 62/399,618, filed Sep. 26, 2016, the disclosures of which are incorporated by reference in their entireties herein.

TECHNICAL FIELD

The present disclosure relates generally to nonwoven abrasive articles, and more particularly to nonwoven fibrous substrates having abrasive particles that are oriented to achieve various advantageous effects.

BACKGROUND

Abrasive articles are well known and much used in industrial processes. It is known that such articles can comprise woven or nonwoven nonwoven fibrouss, see e.g., U.S. Pat. No. 9,248,951 (Nakayama et al.) It is also known that electrostatic forces can be used to manipulate abrasive particles during the manufacture of abrasive articles, see e.g., U.S. Pat. No. 8,869,740 (Moren et al.).

SUMMARY

The present disclosure describes nonwoven abrasive articles, and methods for producing these articles. In the disclosed exemplary embodiments, abrasive particles are applied to a nonwoven fibrous substrate such that the majority of the abrasive particles are adhered to the substrate fibers with an advantageous orientation. The resulting nonwoven abrasive articles may exhibit one or more advantageous technical effects, for example, higher initial material removal rate (initial cut rate), higher long term (equilibrium) cut rate, and/or improved surface finish of the abraded surface, when used in an abrading or polishing process. Surprisingly, the application of an electrostatic force during manufacture causes the majority of the abrasive particles to adopt this advantageous orientation, which would otherwise be a low probability configuration.

Thus, in one exemplary embodiment, the disclosure describes abrasive articles including a nonwoven fibrous substrate having a plurality of fibers, and a multiplicity of shaped abrasive particles, each shaped abrasive particle adhered to a corresponding fiber, each shaped abrasive particle having a length (L) and a width (W) determined in a direction substantially orthogonal to the length, the ratio of the length to the width defining an aspect ratio (L/W) of at least 1.1, each abrasive particle is oriented relative to its corresponding fiber, and more than 50% of the abrasive particles are oriented with respect to their corresponding fiber such that the abrasive particle length extends generally outwardly away from a surface of the corresponding fiber as determined visually from a micrograph using the Orientation Test as defined herein.

In another aspect, the present disclosure describes a method of forming an abrasive article including providing a nonwoven fibrous substrate having a multiplicity of fibers, conveying the nonwoven fibrous substrate through an electric field, and applying a multiplicity of shaped abrasive particles to the nonwoven fibrous substrate while maintaining the electric field. Each shaped abrasive particle is adhered to a corresponding fiber, and each shaped abrasive particle has a length (L) and a width (W) determined in a direction substantially orthogonal to the length, the ratio of the length to the width defining an aspect ratio (L/W) of at least 1.1. Furthermore, each abrasive particle is oriented relative to its corresponding fiber, and more than 50% of the abrasive particles are oriented with respect to their corresponding fiber such that the abrasive particle length extends generally outwardly away from a surface of the corresponding fiber as determined visually using the Orientation Test as defined herein.

In some exemplary embodiments, each shaped abrasive particle is adhered to a corresponding fiber using at least one of a binder, a curable adhesive composition, or thermally-induced bonding to the corresponding fiber.

In some exemplary embodiments of the abrasive article and method, each shaped abrasive particle may have the form of a polygonal prism having two faces and at least three sides thereon and at least one cutting point formed at a vertex, and each particulate is adhered to a nonwoven fiber with a desired advantageous orientation of a cutting point.

Preferably, a majority of the abrasive particles have an orientation relative to the corresponding fiber to which they are adhered such that a majority of the cutting points are oriented in a direction directed away from the fiber surfaces. In certain exemplary embodiments of the abrasive article and method, orientation of each abrasive particle relative to its corresponding fiber exceeds 55%, or even exceeds 65% or 75% according to the Orientation Test.

Listing of Exemplary Embodiments

A. An abrasive article, comprising:
  a nonwoven fibrous substrate comprising a plurality of fibers; and
  a plurality of shaped abrasive particles, each shaped abrasive particle adhered to a corresponding fiber, wherein each shaped abrasive particle has a length (L) and a width (W) determined in a direction substantially orthogonal to the length, the ratio of the length to the width defining an aspect ratio (L/W) of at least 1.1, further wherein each abrasive particle is oriented relative to its corresponding fiber, additionally wherein more than 50% of the abrasive particles are oriented with respect to their corresponding fiber such that the abrasive particle length extends generally outwardly away from a surface of the corresponding fiber as determined visually using the Orientation Test.

B. The abrasive article of Embodiment A, wherein each shaped abrasive particle has the geometric shape of a polygonal prism having two faces and at least three sides thereon.

C. The abrasive article of Embodiment A or B, wherein more than 65% of the abrasive particles are oriented with respect to their corresponding fiber such that the abrasive particle length extends generally outwardly away from the surface of the corresponding fiber as determined visually using the Orientation Test.

D. The abrasive article of Embodiment C, wherein more than 75% of the abrasive particles are oriented with respect to their corresponding fiber such that the abrasive particle length extends generally outwardly away from the surface of the corresponding fiber as determined visually using the Orientation Test.

E. The abrasive article of any preceding Embodiment, wherein the abrasive particles comprise a sol-gel ceramic, aluminum oxide, zirconium oxide, silicon carbide, silicon nitride, diamond, or a combination thereof.

F. The abrasive article of any preceding Embodiment, wherein the nonwoven fibrous substrate is prepared using air-laying, melt-blowing, melt-spinning, or a combination thereof.

G. The abrasive article of any preceding Embodiment, wherein the plurality of fibers comprise (co)polymeric fibers.

H. The abrasive article of any preceding Embodiment, further comprising a binder to adhere the shaped abrasive particles to the plurality of nonwoven fibers.

I. The abrasive article of Embodiment H, wherein the binder comprises a phenolic resin, a phenoxy resin, a Novolac resin, a polyurethane resin, a polyamide resin, an epoxy resin, or a combination thereof.

J. The abrasive article of any preceding Embodiment, wherein the plurality of nonwoven fibers are bonded together at a plurality of intersection points between the fibers.

K. A method of forming an abrasive article, comprising:
  providing a nonwoven fibrous substrate comprising a plurality of fibers; conveying the nonwoven fibrous substrate through an electric field; and
  applying a plurality of shaped abrasive particles to the nonwoven fibrous substrate while maintaining the electric field, wherein each shaped abrasive particle is adhered to a corresponding fiber, further wherein each shaped abrasive particle has a length (L) and a width (W) determined in a direction substantially orthogonal to the length, the ratio of the length to the width defining an aspect ratio (L/W) of at least 1.1, additionally wherein each abrasive particle is oriented relative to its corresponding fiber, further wherein more than 50% of the abrasive particles are oriented with respect to their corresponding fiber such that the abrasive particle length extends generally outwardly away from a surface of the corresponding fiber as determined visually using the Orientation Test.

L. The method of Embodiment K, wherein each shaped abrasive particle has the geometric shape of a polygonal prism having two faces and at least three sides thereon.

M. The abrasive article of Embodiment K or L, wherein more than 65% of the abrasive particles are oriented with respect to their corresponding fiber such that the abrasive particle length extends generally outwardly away from the surface of the corresponding fiber as determined visually using the Orientation Test.

N. The abrasive article of Embodiment M, wherein more than 75% of the abrasive particles are oriented with respect to their corresponding fiber such that the abrasive particle length extends generally outwardly away from the surface of the corresponding fiber as determined visually using the Orientation Test.

O. The method according to any one of Embodiments K, L, M, or N, wherein each shaped abrasive particle is adhered to a corresponding fiber using at least one of a binder, a curable adhesive composition, or thermally-induced bonding to the corresponding fiber.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

Figure 1:
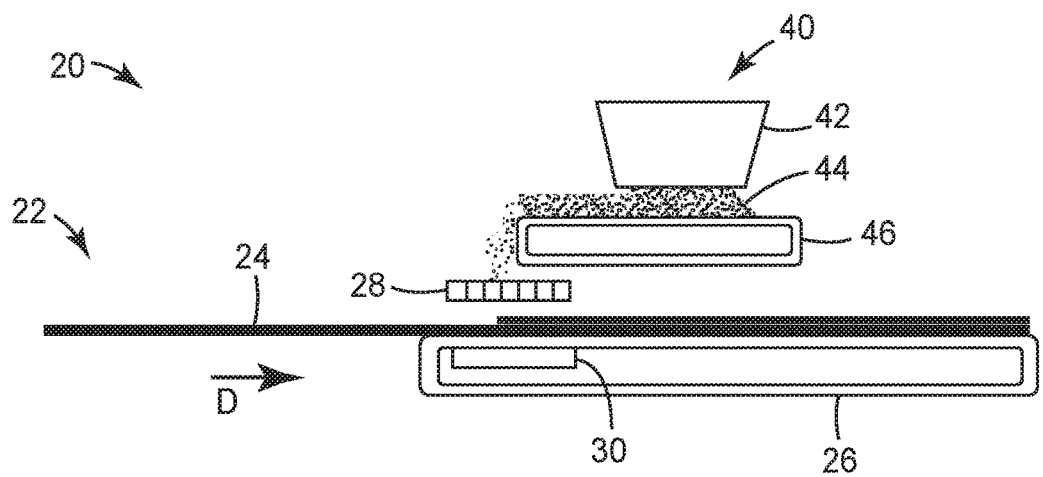
FIG. 1 is a schematic view of an exemplary particle dispensing apparatus according to the present disclosure.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should understood that, as used herein:

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

The terms "about" or "approximately" with reference to a numerical value or a shape means +/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Exemplary Nonwoven Abrasive Articles

The present disclosure describes abrasive articles comprising a nonwoven fibrous substrate having a plurality of fibers, and a multiplicity of shaped abrasive particles, each shaped abrasive particle adhered to a corresponding fiber, each shaped abrasive particle having a length (L) and a width (W) determined in a direction substantially orthogonal to the length, the ratio of the length to the width defining an aspect ratio (L/W) of at least 1.1, each abrasive particle is oriented relative to its corresponding fiber, and more than 50% of the abrasive particles are oriented with respect to their corresponding fiber such that the abrasive particle length extends generally outwardly away from a surface of the corresponding fiber as determined visually from a micrograph using the Orientation Test as defined further below.

The present disclosure also describes methods of forming an abrasive article including providing a nonwoven fibrous substrate having a multiplicity of fibers, conveying the nonwoven fibrous substrate through an electric field, and applying a multiplicity of shaped abrasive particles to the nonwoven fibrous substrate while maintaining the electric field. Each shaped abrasive particle is adhered to a corresponding fiber, and each shaped abrasive particle has a length (L) and a width (W) determined in a direction substantially orthogonal to the length, the ratio of the length to the width defining an aspect ratio (L/W) of at least 1.1. Furthermore, each abrasive particle is oriented relative to its corresponding fiber, and more than 50% of the abrasive particles are oriented with respect to their corresponding fiber such that the abrasive particle length extends generally outwardly away from a surface of the corresponding fiber as determined visually from a micrograph using the Orientation Test as defined herein.

In some exemplary embodiments of the abrasive article and method, each shaped abrasive particle may have the form of a polygonal prism having two faces and at least three sides thereon and at least one cutting point formed at a vertex, and each particulate is adhered to a nonwoven fiber with a desired advantageous orientation of a cutting point.

Preferably, a majority of the abrasive particles have an orientation relative to the corresponding fiber to which they are adhered such that a majority of the cutting points are oriented in a direction directed generally away from the fiber surfaces.

In some exemplary embodiments, each shaped abrasive particle is adhered to a corresponding fiber using at least one of a binder, a curable adhesive composition, or thermally-induced bonding to the corresponding fiber.

In certain exemplary embodiments, more than 55%, 65% or even 75% of the abrasive particles are oriented with respect to their corresponding fiber such that the abrasive particle length extends generally outwardly away from a surface of the corresponding fiber as determined visually from photomicrographs using the Orientation Test as defined herein.

Nonwoven Fibrous Substrates

Any nonwoven fibrous substrate may be suitable for practicing the various exemplary embodiments of the present disclosure. Suitable nonwoven fibrous substrates generally have a thickness of about 0.02 to about 5 millimeters, from about 0.05 to about 2.5 millimeters, or from about 0.1 to about 0.4 millimeter.

Preferably, the nonwoven fibrous substrate is provided in the form of a semi-continuous web or roll. Exemplary semi-continuous web substrates include, but are not limited to, dense nonwoven fibrous webs (for example, including air laid, meltspun, spunbonded, hydroentangled, meltblown nonwoven nonwoven fibrouss), needletacked or stitchbonded nonwoven fibrous webs, scrims, treated versions thereof and combinations of two or more of these materials.

Nonwoven fibrous substrates can be made from any known fibers, whether natural, synthetic or a blend of natural and synthetic fibers. Examples of useful fiber materials include fibers or yarns including polyester (for example, polyethylene terephthalate), polyamide (for example, hexamethylene adipamide, polycaprolactam), polypropylene, acrylic (formed from a polymer of acrylonitrile), cellulose acetate, polyvinylidene chloride-vinyl chloride copolymers, vinylchloride-acrylonitrile copolymers, graphite, polyimide, silk, cotton, linen, jute, hemp, or rayon. Useful fibers may be of virgin materials or of recycled or waste materials reclaimed from garment cuttings, carpet manufacturing, fiber manufacturing, or textile processing, for example. Useful fibers may be homogenous or a composite such as a bicomponent fiber (for example, a co-spun sheath-core fiber). The fibers may be tensilized and crimped, but may also be continuous or semi-continuous filaments such as those formed by a melt-spinning or spun-bonding process.

In some presently preferred embodiments, the nonwoven fibrous substrate is prepared using air-laying, melt-blowing, melt-spinning, or a combination thereof. Suitable air-laid nonwoven fibrous substrates and methods of making such air-laid webs are described, for example, in U.S. Pat. No. 9,422,653; and U.S. Pub. Pat. Appl. Nos. 2013/0101805 and 2013/0030340 (all Wu et al.) Suitable melt-blown nonwoven fibrous substrates are described, for example, in U.S. Pat. Nos. 8,802,002; and 6,492,286 (all Berrigan et al.). Suitable melt-spun or spun-bond nonwoven fibrous substrates are described, for example, in U.S. Pat. Nos. 9,416,485; 9,194,065; 6,824,372; and 6,607624 (all Berrigan et al.)

The plurality of fibers may advantageously include (co)polymeric fibers. When the plurality of fibers include (co)polymeric fibers, the plurality of abrasive particles may be bonded to the nonwoven fibers using thermally-induced bonding by heating the fibers to a temperature at or above the softening point of the (co)polymer of which the fibers are comprised, but preferably below the melting point of that (co)polymer.

Any suitable (co)polymer may be used in practicing exemplary embodiments in which the plurality of fibers advantageously includes (co)polymeric fibers. Presently advantageous (co)polymers include, for example, polyethylene, polypropylene, polyamide, polyurethane, polyester, and combinations thereof.

In some exemplary embodiments, it may be preferred to use multi-component fibers. As used herein, the term "multi-component fiber" is used to refer to a fiber formed from two or more polymeric materials. Suitable multi-component fiber configurations include, but are not limited to, a sheath-core configuration, a side-by-side configuration, and an "islands-in-the-sea" configuration (for example, fibers produced by Kuraray Company, Ltd., Okayama, Japan). Suitable multi-component fibers are described, for example, in U.S. Pat. No. 6,057,256 (Krueger et al.).

Bi-component fibers are presently preferred multi-component fibers. As used herein, "bi-component" fibers are fibers with two components, each component occupying a part of the cross-sectional area of the fiber and extending over a substantial length of the fiber). Bi-component fibers may be formed from blends of materials, including materials into which certain additives have been blended, such as pigments or dyes.

Bi-component microfibers, such as core-sheath or side-by-side bi-component fibers, may be particularly useful and advantageous. However, in some exemplary embodiments, a blend of two or more monocomponent fiber composaitions exhibiting different softening or melting points may also be advantageously used. Monocomponent fibers are fibers in which the fibers have essentially the same composition across their cross-section, but "monocomponent" also includes blends or additive-containing fibers in which a continuous phase of substantially uniform composition extends across the cross-section and over the length of the fiber). Among other benefits, the ability to use single-component fibers reduces complexity of manufacturing and places fewer limitations on use of the web.

For embodiments in which the fibers include (co)polymeric fibers, it is often found advantageous to use thermal bonding to bond together the plurality of fibers at a plurality of intersection points between the fibers. Such bonding is described, for example, in U.S. Pat. Nos. 9,139,940; 7,695,660; 7,279,440; and 6,916,752 (all Berrigan et al.). Such bonding between fibers can act to increase the integrity of the nonwoven fibrous substrate. The strength of the nonwoven fibrous substrate should ideally be sufficient to resist tearing or other damage during abrading processes.

The thickness and smoothness of the nonwoven fibrous substrate should also be suitable to provide the desired thickness and smoothness of the coated abrasive article; for example, depending on the intended application or use of the coated abrasive article.

The nonwoven fibrous substrate may have any basis weight; typically, in a range of from 100 to 1000 grams per square meter (gsm), more typically 450 to 600 gsm, and even more typically 450 to 575 gsm.

To promote adhesion of optional binder resins or adhesives to the nonwoven fibrous substrate, one or more surfaces of the substrate may be modified by known methods including corona discharge, ultraviolet light exposure, electron beam exposure, flame discharge, and/or scuffing.

In some exemplary embodiments, the nonwoven fibrous substrate includes a fiber scrim. Suitable fiber scrims may include woven, and knitted cloths, for example, which may include inorganic and/or organic fibers. For example, the fibers in the scrim may include wire, ceramic fiber, glass fiber (for example, fiberglass), and organic fibers (for example, natural and/or synthetic organic fibers). Examples of organic fibers include cotton fibers, jute fibers, and canvas fibers. Examples of synthetic fibers include nylon fibers, rayon fibers, polyester fibers, and polyimide fibers).

Abrasive Particles

The abrasive particles suitable for use in exemplary embodiments of the present disclosure should have sufficient hardness and surface roughness to function as abrasive particles in abrading or polishing processes. Preferably, the abrasive particles have a Mohs hardness of at least 4, at least 5, at least 6, at least 7, or even at least 8.

In some exemplary embodiments, the abrasive particles may be selected to have a length and/or width in a range of from 0.1 micrometers to 3.5 millimeters (mm), more typically 0.05 mm to 3.0 mm, and more typically 0.1 mm to 2.6 mm, although other lengths and widths may also be used. The abrasive particles may be selected to have a thickness in a range of from 0.1 micrometer to 1.6 mm, more typically from 1 micrometer to 1.2 mm, although other thicknesses may be used.

Preferred shaped abrasive particles for the practice of the present disclosure have a shape defined by a length (L) and a width (W) determined in a direction substantially orthogonal to the length, and the ratio of the length to the width defines an aspect ratio (L/W) of at least 1.1, at least 1.2, at least 1.3, at least 1.4, at least 1.5, at least 1.75, at least 2, or even at least 3, 4, 5, 6, or more. Most preferred abrasive particles generally have an aspect ratio of less than 5, less than 4, less than 3, or even less than 2.

Shaped abrasive particle having a length (L) and a width (W) determined in a direction substantially orthogonal to the length, wherein the ratio of the length to the width defines an aspect ratio (L/W) of at least 1.1, may be used advantageously in the processes of the present disclosure.

The abrasive particles may comprise a synthetic sol-gel ceramic material or a natural mineral, such as aluminum oxide, zirconium oxide, silicon carbide, silicon nitride, diamond, or a combination thereof.

Suitable shaped abrasive particles include shaped ceramic abrasive particles or shaped abrasive composite particles and combinations thereof. Examples of suitable shaped abrasive particles include, but are not limited to, fused aluminum oxide; heat-treated aluminum oxide; white fused aluminum oxide; ceramic aluminum oxide materials such as those commercially available under the trade designation 3M CERAMIC ABRASIVE GRAIN from 3M Company, St. Paul, Minn.; brown aluminum oxide; blue aluminum oxide; silicon carbide (including green silicon carbide); titanium diboride; boron carbide; tungsten carbide; garnet; titanium carbide; diamond; cubic boron nitride; garnet; fused alumina zirconia; iron oxide; chromia; zirconia; titania; tin oxide; quartz; feldspar; flint; emery; sol-gel-derived abrasive particles (e.g., including shaped and crushed forms); and combinations thereof. Further examples include shaped abrasive composites of abrasive particles in a binder matrix, such as those described in U.S. Pat. No. 5,152,917 (Pieper et al.).

Examples of suitable sol-gel-derived abrasive particles from which the desired shaped abrasive particles can be isolated, and methods for their preparation can be found, in U.S. Pat. No. 4,314,827 (Leitheiser et al.); U.S. Pat. No. 4,623,364 (Cottringer et al.); U.S. Pat. No. 4,744,802 (Schwabel), U.S. Pat. No. 4,770,671 (Monroe et al.); and U.S. Pat. No. 4,881,951 (Monroe et al.). It is also contemplated that the shaped abrasive particles could comprise abrasive agglomerates such, for example, as those described in U.S. Pat. No. 4,652,275 (Bloecher et al.) or U.S. Pat. No. 4,799,939 (Bloecher et al.).

Preferably, the abrasive particles (and especially the abrasive particles) include ceramic abrasive particles such as, for example, sol-gel-derived polycrystalline alpha alumina particles. Ceramic abrasive particles composed of crystallites of alpha alumina, magnesium alumina spinel, and a rare earth hexagonal aluminate may be prepared using sol-gel precursor alpha alumina particles according to methods described in, for example, U.S. Pat. No. 5,213,591 (Celikkaya et al.) and U.S. 2009/0165394 A1 (Culler et al.) and 2009/0169816 A1 (Erickson et al.).

Further details concerning methods of making sol-gel derived abrasive particles can be found in, for example, U.S. Pat. No. 4,314,827 (Leitheiser) U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.); and in U.S. 2009/0165394 A1 (Culler et al.).

Useful shaped abrasive particles can be found in U.S. Pat. No. 5,201,916 (Berg); U.S. Pat. No. 5,366,523 (Rowenhorst (Re 35,570)); and U.S. Pat. No. 5,984,988 (Berg). U.S. Pat. No. 8,034,137 (Erickson et al.) describes alumina abrasive particles that have been formed in a specific shape, then crushed to form shards that retain a portion of their original shape features.

It is presently preferred in the practice of the processes of the present disclosure to use precision shaped abrasive particles having the form of a polygonal prism having two faces and at least three sides thereon.

In some exemplary embodiments, precision shaped alpha alumina particles have a shape that is at least partially determined by the shapes of cavities in a production tool used to make them. Details concerning such precisely-shaped abrasive particles and methods for their preparation can be found, for example, in U.S. Pat. Nos. 9,039,797; 8,845,773; 8,764,865; 8,142,531 (Adefris et al.); U.S. Pat. No. 8,142,891 (Culler et al.); U.S. Pat. No. 8,142,532 (Erickson et al.); and in U.S. Pat. Appl. Publ. Nos. 2012/0227333 (Adefris et al.); 2013/0040537 (Schwabel et al.); and 2013/0125477 (Adefris).

One particularly useful precisely-shaped abrasive particle shape is that of a truncated triangular pyramid with sloping sidewalls, which is described in the above cited references.

Optional Binder or Adhesive

The abrasive article may, in some exemplary embodiments, further advantageously include a binder or adhesive to adhere the shaped abrasive particles to the plurality of nonwoven fibers. The binder or adhesive may advantageously be selected from, for example, a phenolic resin, a phenoxy resin, a Novolac resin, a polyurethane resin, a polyamide resin, an epoxy resin, or a combination thereof.

Preferably, a particle-adherent binder or adhesive layer (e.g., a coating) is used to provide a particle-adherent surface the layer on the nonwoven fibrous web or the nonwoven fibers themselves.

The particle-adherent binder or adhesive layer may be of any suitable composition. For example, such a coating may be a "make coat" as is commonly referred to in the abrasive arts. Such a make coat may be e.g. a phenolic resin or any of the other make coat compositions that are known. A make coat applicator 405 can be, for example, a coater, a roll coater, a spray system, or a rod coater.

In various exemplary embodiments, the make coat layer is formed by at least partially curing a make layer precursor that is a curable tacky adhesive composition according to the present disclosure. The tacky curable adhesive composition includes resole phenolic resin and an aliphatic tack modifier, and the amount of resole phenolic resin includes from 60 to 98 weight percent of the combined weight of the resole phenolic resin and the aliphatic tack modifier.

Phenolic resins are generally formed by condensation of phenol and formaldehyde, and are usually categorized as resole or novolac phenolic resins. Novolac phenolic resins are acid catalyzed and have a molar ratio of formaldehyde to phenol of less than 1:1. Resole (also resol) phenolic resins can be catalyzed by alkaline catalysts, and the molar ratio of formaldehyde to phenol is greater than or equal to one, typically between 1.0 and 3.0, thus presenting pendant methylol groups. Alkaline catalysts suitable for catalyzing the reaction between aldehyde and phenolic components of resole phenolic resins include sodium hydroxide, barium hydroxide, potassium hydroxide, calcium hydroxide, organic amines, and sodium carbonate, all as solutions of the catalyst dissolved in water.

Resole phenolic resins are typically coated as a solution with water and/or organic solvent (e.g., alcohol). Typically, the solution includes about 70 percent to about 85 percent solids by weight, although other concentrations may be used.

Phenolic resins are well-known and readily available from commercial sources. Examples of commercially available resole phenolic resins useful in practice of the present disclosure include those marketed by Durez Corporation under the trade designation VARCUM (e.g., 29217, 29306, 29318, 29338, 29353); those marketed by Ashland Chemical Co. of Bartow, Fla. under the trade designation AEROFENE (e.g., AEROFENE 295); and those marketed by Kangnam Chemical Company Ltd. of Seoul, South Korea under the trade designation PHENOLITE (e.g., PHENOLITE TD-2207).

In addition to the resole phenolic resin, the curable tacky binder precursor may advantageously include an aliphatic tack modifier. The curable tacky binder precursor contains from 60 to 98 weight percent, or 90 to 98 weight, percent of the resole phenolic resin based on the combined weight of the resole phenolic resin and the aliphatic tack modifier. Accordingly, the curable tacky binder precursor composition contains from 2 to 40 weight percent, or 2 to 10 weight percent, of the aliphatic tack modifier, based on the combined weight of the resole phenolic resin and the aliphatic tack modifier. The aliphatic tack modifier has the unexpected effect of modifying the tackiness of the resole phenolic resin, thereby resulting in the curable tacky binder precursor composition.

Examples of suitable aliphatic tack modifiers include: aliphatic rosins and aliphatic derivatives thereof aliphatic liquid hydrocarbon resins; aliphatic solid hydrocarbon resins; liquid natural rubber; hydrogenated polybutadiene; polytetramethylene ether glycol; isooctyl acrylate acrylic acid copolymers as described in U.S. Pat. No. 4,418,120 (Kealy et. al; and acrylic zwitterionic amphiphilic polymers as described in U.S. 2014/0170362 A1 (Ali et al.). Combinations of more than one resole phenolic resin and/or more than one aliphatic tack modifier may be used if desired.

Useful aliphatic rosins and aliphatic derivatives thereof include, for example, aliphatic esters of natural and modified rosins and the hydrogenated derivatives thereof (e.g., a glycerol ester of tall oil rosin marketed as PERMALYN 2085 and a glycerol ester of hydrogenated gum rosin marketed as FORAL 5-E, both available from Eastman Chemical Company, and an aliphatic rosin ester dispersion obtained as AQUATAC 6085 from Arizona Chemical, Jacksonville, Fla.), hydrogenated rosin resins (e.g., partially hydrogenated rosin is produced by Eastman Chemical Company as STAYBELITE-E and completely hydrogenated rosin is branded as FORAL AX-E), dimerized rosin resins (e.g., POLY-PALE partially dimerized rosin is a partially dimerized rosin product offered by Eastman Chemical Company), and aliphatic modified rosin resins (e.g., maleic anhydride modified rosin resins marketed as LEWISOL 28-M or LEWISOL 29-M).

Examples of suitable aliphatic hydrocarbon resin tackifiers include tackifiers derived from liquid C5 feedstock by Lewis acid catalyzed polymerization, and hydrogenated derivatives thereof. Commercially available aliphatic hydrocarbon resin tackifiers include those marketed by Eastman Chemical Company, Kingsport, Tenn., under the trade designations PICCOTAC 1020, PICCOTAC 1095, PICCOTAC 1098, PICCOTAC 1100, and PICCOTAC 1115, and in hydrogenated forms as EASTOTAC H-100E, EASTOTAC H-115E and EASTOCTAC H-130E.

Liquid natural rubber is a modified form of natural rubber with a shorter polymeric chain. Many liquid natural rubbers are commercially available. Examples include liquid natural rubbers marketed by DPR industries, Coatesville, Pa., under the trade designations DPR 35, DPR 40, DPR 75, and DPR 400.

Hydrogenated polybutadienes are available commercially; for example, as KRATON LIQUID L1203 from Kraton Polymers US LLC, Houston, Tex., and as POLYTAIL from Mitsubishi International Polymer/Trade Corporation, Newark, N.J. Polytetramethylene ether glycol (PTMEG) is a waxy, white solid that melts to a clear, colorless viscous liquid near room temperature. PTMEG is produced by the catalyzed polymerization of tetrahydrofuran. Exemplary polytetramethylene ether glycols include those available under the trade designation TETRATHANE from Invista, Waynesboro, Va. (e.g., TETRATHANE 250, 650, 1000, 1400, 1800, 2000 and 2900). Useful copolymers of isooctyl acrylate and acrylic acid are described in U.S. Pat. No. 4,418,120 (Kealy et. al). Examples include copolymers of isooctyl acrylate (IOA) and acrylic acid (AA) wherein the weight ratio of IOA:AA is in the range of from 93:7 to 97:3; more preferably abut 95:5.

Useful aliphatic zwitterionic amphiphilic acrylic polymers are described in U.S. 2014/0170362 A1 (Ali et al.). Examples of useful zwitterionic amphiphilic acrylic polymers include the polymerized product of an anionic monomer that is acrylic acid, methacrylic acid, a salt thereof, or a blend thereof; an acrylate or methacrylate ester of an alcohol having between 8 and 12 carbons; and a cationic monomer that is an acrylate or methacrylate ester having alkylammonium functionality. Optionally, one or more additional monomers are included in the zwitterionic polymers of the invention. In some embodiments the anionic monomer is acrylic or methacrylic acid, the acid is converted either before or after polymerization to a corresponding carboxylate salt by neutralization.

In some embodiments, the acrylic acid, methacrylic acid, or a salt thereof is a mixture of two or more thereof. In some embodiments, the acrylate or methacrylate ester is a mixture of two or more such esters; in some embodiments, the cationic monomer is a mixture of two or more such cationic monomers.

In some embodiments, the polymerized product of acrylic acid, methacrylic acid, a salt thereof or blend thereof is present in the zwitterionic polymer at about 0.2 wt % to 5 wt % based on the total weight of the polymer, or at about 0.5 wt % to 5 wt % of the zwitterionic polymer, or in various intermediate levels such as 0.3 wt %, 0.4 wt %, 0.6 wt %, 0.7 wt %, and all other such individual values represented by 0.1 wt % increments between 0.2 and 5.0 wt %, and in ranges spanning between any of these individual values in 0.1 wt % increments, such as 0.2 wt % to 0.9 wt %, 1.2 wt % to 3.1 wt %, and the like.

In some embodiments, the acrylate or methacrylate ester of an alcohol having between 8 and 12 carbons includes acrylate or methacrylate esters of linear, branched, or cyclic alcohols. While not intended to be limiting, examples of alcohols useful in the acrylate or methacrylate esters include octyl, isooctyl, nonyl, isononyl, decyl, undecyl, and dodecyl alcohol. In some embodiments, the alcohol is isooctyl alcohol. In some embodiments, the acrylate or methacrylate ester of an alcohol having between 8 and 12 carbons is a mixture of two or more such compounds.

In some embodiments, polymerized product of the acrylate or methacrylate ester of an alcohol having between 8 and 12 carbons is present in the zwitterionic polymer at about 50 wt % to 95 wt % of the total weight of the polymer, or at about 60 wt % to 90 wt % of the total weight of the polymer, or at about 75 wt % to 85 wt % of the total weight of the polymer, or in various intermediate levels such as 51 wt %, 52 wt %, 53 wt %, 54 wt %, and all other such values individually represented by 1 wt % increments between 50 wt % and 95 wt %, and in any range spanning between any of these individual values in 1 wt % increments, for example ranges such as about 54 wt % to 81 wt %, about 66 wt % to 82 wt %, about 77 wt % to 79 wt. 20%, and the like.

In some embodiments, the cationic monomer is an acrylate or methacrylate ester including an alkylammonium functionality. In some embodiments, the cationic monomer is a 2-(trialkylammonium)ethyl acrylate or a 2-(trialkylammonium)ethyl methacrylate. In such embodiments, the nature of the alkyl groups is not particularly limited; however, cost and practicality limit the number of useful embodiments.

In some embodiments, the 2-(trialkylammonium)ethyl acrylate or 2-(trialkylammonium)ethyl methacrylate is formed by the reaction of 2-(dimethylamino) ethyl acrylate or 2-(dimethylamino)ethyl methacrylate with an alkyl halide; in such embodiments, at least two of the three alkyl groups of the 2-(trialkylammonium)ethyl acrylate or 2-(trialkylammonium)ethyl methacrylate are methyl. In some such embodiments, all three alkyl groups are methyl groups. In other embodiments, two of the three alkyl groups are methyl and the third is a linear, branched, cyclic, or alicyclic group having between 2 and 24 carbon atoms, or between 6 and 20 carbon atoms, or between 8 and 18 carbon atoms, or 16 carbon atoms. In some embodiments, the cationic monomer is a mixture of two or more of these compounds.

The anion associated with the ammonium functionality of the cationic monomer is not particularly limited, and many anions are useful in connection with various embodiments of the invention. In some embodiments, the anion is a halide anion, such as chloride, bromide, fluoride, or iodide; in some such embodiments, the anion is chloride. In other embodiments the anion is $BF_4-$, $-N(SO_2CF_3)_2$, $-O_3SCF_3$, or $-O_3SC_4F_9$. In other embodiments, the anion is methyl sulfate. In still other embodiments, the anion is hydroxide.

In some embodiments, the one or more cationic monomers includes a mixture of two or more of these anions. In some embodiments, polymerization is carried out using 2-(dimethylamino)ethyl acrylate or 2-(dimethylamino)ethyl methacrylate, and the corresponding ammonium functionality is formed in situ by reacting the amino groups present within the polymer with a suitable alkyl halide to form the corresponding ammonium halide functionality. In other embodiments, the ammonium functional monomer is incorporated into the cationic polymer and then the anion is exchanged to provide a different anion. In such embodiments, ion exchange is carried out using any of the conventional processes known to and commonly employed by those having skill in the art.

In some embodiments, the polymerized product of the cationic monomer is present in the zwitterionic polymer at about 2 wt % to 45 wt % based on the total weight of the zwitterionic polymer, or at about 2 wt % to 35 wt % of the zwitterionic polymer, or at about 4 wt % to 25 wt % of the zwitterionic polymer, or at about 6 wt % to 15 wt % of the zwitterionic polymer, or at about 7 wt % to 10 wt % of the zwitterionic polymer, or in various intermediate levels such as 3 wt %, 5 wt %, 6 wt %, 8 wt %, and all other such individual values represented by 1 wt % increments between 2 wt % and 45 wt %, and in any range spanning these individual values in 1 wt % increments, such as 2 wt % to 4 wt %, 7 wt % to 38 wt %, 20 wt % to 25 wt %, and the like.

The curable tacky binder precursor material may also contain additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the preferred properties. The coupling agents can improve adhesion to the abrasive particles and/or filler. The binder chemistry may be thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.).

The curable tacky binder precursor material may also contain filler materials or grinding aids, typically in the form of a particulate material. Typically, the particulate materials are inorganic materials. Examples of useful fillers for this disclosure include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

The size layer precursor may be the same as or different than the make layer precursor. Examples of suitable thermosetting resins that may be useful for the size layer precursor include, for example, free-radically polymerizable monomers and/or oligomers, epoxy resins, acrylic resins, urethane resins, phenolic resins, urea-formaldehyde resins, melamine-formaldehyde resins, aminoplast resins, cyanate resins, or combinations thereof.

Useful binder precursors include, for example, thermally curable resins and radiation curable resins, which may be cured, for example, thermally and/or by exposure to radiation. The size layer precursor may also be modified various additives (e.g., as discussed above with respect to the make coat precursor). Catalysts and/or initiators may be added to thermosetting resins; for example, according to conventional practice and depending on the resin used.

In some embodiments, heat energy is applied to advance curing of the thermosetting resins (e.g., size layer precursor or curable tacky binder material precursor compositions according to the present disclosure). However, other sources of energy (e.g., microwave radiation, infrared light, ultraviolet light, visible light, may also be used). The selection will generally be dictated by the particular resin system selected.

Preferably, the optional binder or adhesive is a reactive component that undergoes a curing reaction to adhere the shaped abrasive particles to the nonwoven fibers. The curing reaction may, in some exemplary embodiments, be a reaction of monomers, oligomers and/or pre-polymers to form the binder or adhesive in situ. Any suitable curing reaction may be used; however, free radical polymerization, condensation reactions, crosslinking reactions, and the like are generally preferred.

The curing reaction may be thermally-induced, or may be a radiation-induced curing reaction. Suitable radiation includes actinic radiation such as ultraviolet, visible and/or infrared light, and/or ionizing radiation such as electron beam radiation, gamma ray exposure, and the like.

The optional binder or adhesive may be applied before, during, or after the application of the shaped abrasive particles to the nonwoven fibrous substrate. It is presently preferred that the optional binder or adhesive be applied to the nonwoven fibrous substrate before applying, and more preferably before or during orientation of the shaped abrasive particles on the surfaces of the corresponding nonwoven fibers. It is also presently preferred to initiate curing of the optional binder or adhesive during or after orientation of the shaped abrasive particles on the surfaces of the corresponding nonwoven fibers.

Optional Surface Treatments

In some exemplary embodiments, the shaped abrasive particles may be surface-treated with a coupling agent (e.g., an organosilane coupling agent) or other physical treatment (e.g., iron oxide or titanium oxide) to enhance adhesion of the crushed abrasive particles to the nonwoven fibers. The abrasive particles may be treated before combining them with the nonwoven fibers, or they may be surface treated in situ by including a coupling agent which may couple to the nonwoven fibers, or to an optional binder or adhesive as described further below.

Surface coatings on the abrasive particles may also be used to improve the adhesion between the abrasive particles and an optional binder or adhesive material, or to aid in deposition of the abrasive particles. In one embodiment, surface coatings as described in U.S. Pat. No. 5,352,254 (Celikkaya) in an amount of 0.1 to 2 percent surface coating to abrasive particle weight may be used. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz et al.).

Additionally, the surface coating may prevent shaped abrasive particles from capping. Capping describes the phenomenon where metal particles from the workpiece being abraded become welded to the tops of the abrasive particles. Surface coatings to perform the above functions are known to those of skill in the art.

Optional Grinding Aids

A grinding aid is a material that has a significant effect on the chemical and physical processes of abrading, which results in improved performance. Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound.

Examples of such materials include chlorinated waxes like tetrachloronaphthalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. A combination of different grinding aids may be used, and in some instances this may produce a synergistic effect.

Grinding aids can be particularly useful in coated abrasives. In coated abrasive articles, the grinding aid is typically used in a supersize coat, which is applied over the surface of the abrasive particles. Sometimes, however, the grinding aid is added to the size coat. Typically, the amount of grinding aid incorporated into coated abrasive articles are about 50-300 grams per square meter ($g/m^2$), preferably about 80-160 $g/m^2$.

Further details regarding coated abrasive articles and methods of their manufacture can be found, for example, in U.S. Pat. No. 4,734,104 (Broberg); U.S. Pat. No. 4,737,163 (Larkey); U.S. Pat. No. 5,203,884 (Buchanan et al.); U.S. Pat. No. 5,152,917 (Pieper et al.); U.S. Pat. No. 5,378,251 (Culler et al.); U.S. Pat. No. 5,436,063 (Follett et al.); U.S. Pat. No. 5,496,386 (Broberg et al.); U.S. Pat. No. 5,609,706 (Benedict et al.); U.S. Pat. No. 5,520,711 (Helmin); U.S. Pat. No. 5,961,674 (Gagliardi et al.), and U.S. Pat. No. 5,975,988 (Christianson).

Exemplary Particle Loading Apparatus and Methods of Making Abrasive Articles

Various exemplary embodiments of the disclosure will now be described with particular reference to the Drawings.

Referring now to FIG. 1, a schematic view of an exemplary particle dispensing apparatus 20 according to the present disclosure is illustrated. Particle dispensing apparatus 20 includes a web path 22 for a coated web 24. In many convenient embodiments, coated web 24 will be a nonwoven web. Coated web 24 is conveyed along web path 22 in direction "D," conveniently over a web conveyor belt 26. While passing over web conveyor belt 26, coated web 24 passes between a first, screen electrode 28 and a second electrode 30. During operation particle dispensing apparatus 20, a potential difference is applied between screen electrode 28 and second electrode 30. In some embodiments, screen electrode 28 is the high voltage electrode and second electrode 30 is the ground electrode. In other embodiments, the two electrodes are charged in opposite polarity.

Positioned above screen electrode 28 is a particle feeding system 40 including a hopper 42 releasing shaped particles 44 onto a conveyor 46. Particles 44 fall through screen electrode 28 where they receive a charge and are accelerated towards second electrode 30. They impinge on coated web 24, where they adhere.

Figure 2:
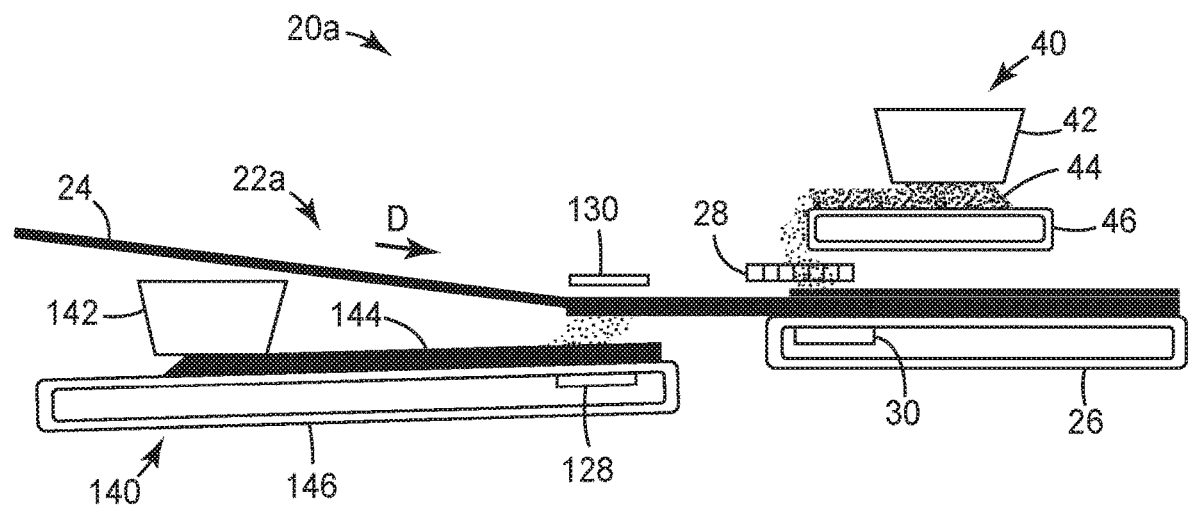
FIG. 2 is a schematic view of an alternate embodiment of a particle dispensing apparatus.

Referring now to FIG. 2, a schematic view of an alternate embodiment of particle dispensing apparatus 20a according to the present disclosure is illustrated. Particle dispensing apparatus 20a is conveniently employed when a more even distribution of particles to both major surfaces of coated web 24 is desired. Particle dispensing apparatus 20a includes a web path 22a for a coated web 24. In many convenient embodiments, coated web 24 will be a nonwoven web. Similarly to the dispensing apparatus 20 of FIG. 1, coated web 24 is conveyed along web path 22a in direction "D".

Positioned above screen electrode 28 is a particle feeding system 40 including a hopper 42 releasing shaped particles 44 onto conveyor 46. Particles 44 fall through screen electrode 28 where they receive a charge and are accelerated towards second electrode 30. They impinge on coated web 24, where they adhere.

However, in this embodiment, web path 22a is also passed between first electrode 128 and second electrode 130. During operation of particle dispensing apparatus 20a, a potential difference is applied between first electrode 128 and second electrode 130. In some embodiments, first electrode 128 is the high voltage electrode and second electrode 130 is the ground electrode. In other embodiments, the two electrodes are charged in opposite polarity.

A particle feeding system 140 is provided, including a hopper 142 releasing shaped particles 144 onto a conveyor 146. Particles 144 are drawn upwards by the electric field between first electrode 128 and second electrode 130. They impinge on coated web 24, where they adhere.

Figure 3:
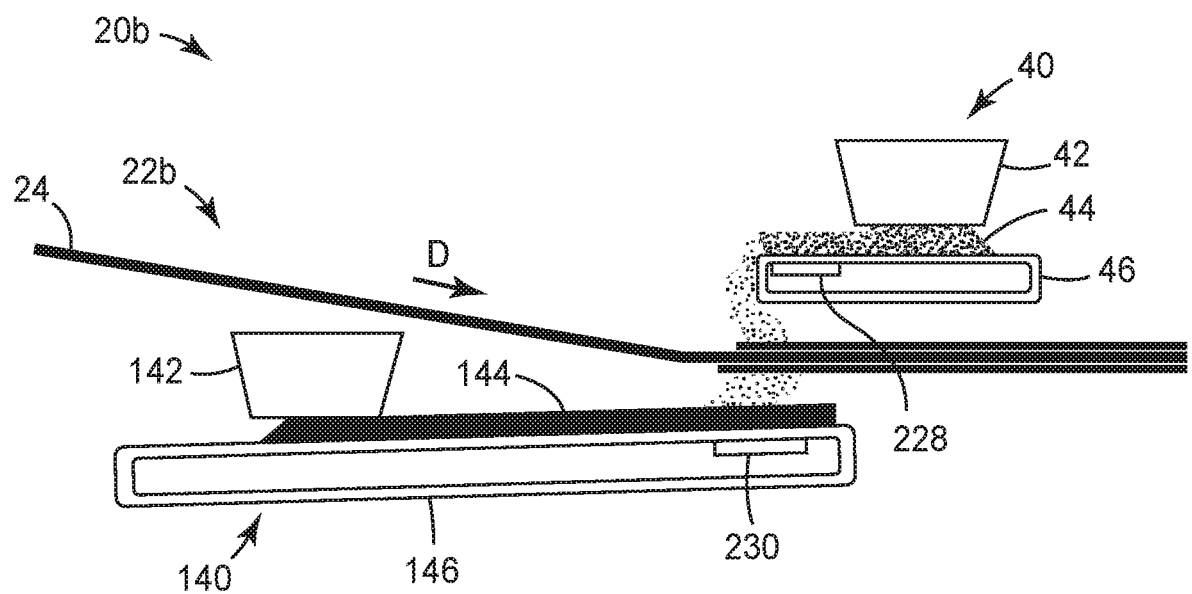
FIG. 3 is a schematic view of another alternate embodiment of a particle dispensing apparatus.

Referring now to FIG. 3, a schematic view of another alternate embodiment of particle dispensing apparatus 20b according to the present disclosure is illustrated. This embodiment is similar to the embodiment of FIG. 2, except that a single electrode pair is used to impel the particles against coated web 24. Particle dispensing apparatus 20b includes a web path 22b for a coated web 24. In many convenient embodiments, coated web 24 will be a nonwoven web. Similarly to the dispensing apparatus 20 of FIG. 1, coated web 24 is conveyed along web path 22b in direction "D".

A particle feeding system 40 including a hopper 42 releasing shaped particles 44 onto a conveyor 46 is provided. Another particle feeding system 140 is provided, including a hopper 142 releasing shaped particles 144 onto a conveyor 146. A single electrode pair is present, first electrode 228 and second electrode 230. In one embodiment, first electrode 228 is conveniently disposed within conveyor 46 and second electrode 230 is conveniently disposed within conveyor 146. In another embodiment, first electrode 228 is a screen positioned above second electrode 230 and web path 22b passes between first electrode 228 and second electrode 230. In convenient embodiments, first electrode 228 and second electrode 230 are charged in opposite polarity. Particles 44 and 144 are impelled towards coated web 24 by the electric field, where they adhere.

The operation of exemplary embodiments of the present disclosure will be further described with regard to the following non-limiting detailed Examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Solvents and other reagents used may be obtained from Sigma-Aldrich Chemical Company (Milwaukee, Wis.) unless otherwise noted. In addition, Table 1 provides abbreviations and a source for all materials used in the Examples below:

TABLE 1

| Materials | |
|---|---|
| ABBREVIATION | DESCRIPTION |
| CaCO$_3$ | Calcium carbonate, obtained under the trade designation "HUBERCARB" from Huber Engineered Materials, Quincy, Illinois |
| CUR | Aromatic amine curative, obtained under the trade designation "LAPOX K-450" from Atul Americas Inc., Charlotte, North Carolina |
| FS | Silicon dioxide, obtained under the trade designation "CAB-O-SIL UNTREATED FUMED SILICA, M-5" from Cabot Corp., Cambridge, Massachusetts |
| L1 | A 1.75% dispersion of synthetic clay (obtained under the trade designation "LAPONITE-RD" from BYK Additives, Inc., Louisville, Kentucky) in tap water |
| LiSt | Lithium stearate, obtained under the trade designation "LIC 17" from Baerlocher USA, Cincinnati, Ohio |
| PMA | Propylene glycol monomethyl ether acetate, obtained under the trade designation "DOWANOL PMA" from Dow Chemical Corporation, Midland, Michigan |
| PME | Propylene glycol monomethyl ether, obtained under the trade designation "DOWANOL PM" from Dow Chemical Company, Midland, Michigan |
| PU | Blocked urethane prepolymer, obtained under the trade designation "ADIPRENE BL16" from Chemtura Corporation, Middlebury, Connecticut |
| Resin 1 | A 25% solution of phenoxy resin in 1-methoxy-2-acetopropane, obtained under the trade designation "INCHEMREZ PKHS 25M SOLUTION" from Inchem Corp., Rockhill, South Carolina |
| Resin 2 | Phenolic resin obtained under the trade designation "PREFERE 80 5077A" from Arclin, Mississauga, Ontario, Canada |
| S1 | Ethoxylated nonionic surfactant, obtained under the trade designation "DYNOL 604" from Air Products and Chemicals Inc., Allentown, Pennsylvania |
| SAP | Shaped abrasive particles were prepared according to the disclosure of U.S. Pat. No. 8,142,531. The shaped abrasive particles were prepared by molding alumina sol gel in equilateral triangle-shaped polypropylene mold cavities. After drying and firing, the resulting shaped abrasive particles were about 0.25 mm (side length) × 0.07 mm thick, with a draft angle of approximately 98 degrees. |
| SR | A 75% hydroxyethyl ethylene urea in water, obtained under the trade designation "SR511A" from Sartomer Inc., Exton, Pennsylvania |

Orientation Test for Use in Assessing the Examples

The Orientation Test was developed to visually measure the comparative particle orientation resulting from the various particle coating methods. At least three 100× photomicrographs were taken of representative areas of the surface of the particle-coated nonwoven fibrous substrate. The photomicrographs were then visually inspected to determine the orientation of the particles with respect to the individual fibers of the web.

A particle was counted as radially-oriented if it was bound to the fiber surface by a point or an edge. A particle was counted as tangentially-oriented if it was bound to the fiber surface on a major face of the abrasive particle. On the photomicrographs included in the drawings for the corresponding Examples, radially-oriented particles were marked with a circle, and tangentially-oriented particles were marked with a square.

The percentage of particles that were radially-oriented with respect to their corresponding fiber such that the abrasive particle length extended generally outwardly away from the surface of the corresponding fiber, was determined based on the orientation determined for all of the particles shown in the three photomicrographs. In no case were fewer than 100 particles used in the determination of the percentage of particle orientation determined with the Orientation Test.

Preparing a Nonwoven Fibrous Web for Use in the Examples

A nonwoven fibrous web was formed on an air laid fiber web forming machine available under the trade designation RANDO-WEBBER from the Rando Machine Corporation of Macedon, N.Y. The fiber web was formed from 90% 78 decitex (70 denier) nylon 6 fiber and 10% 17 decitex (15 denier) nylon 6,6 fiber (available from E. I. du Pont de Nemours & Company, Wilmington, Del.). The weight of the web was approximately 200 g/m². The web was conveyed to a two-roll coater where a binder comprising of the composition shown in Table 2 was applied.

The binder was applied at a dry add-on weight of 76 g/m², and was cured to a non-tacky condition by passing the coated web through a convection oven at 325° F. (163° C.) for 4.3 minutes, yielding a pre-bonded, nonwoven web of approximately 10 mm thickness and having a basis weight of 276 g/m².

TABLE 2

| Component | Weight % |
| --- | --- |
| PU | 35.6 |
| CUR | 4.9 |
| Resin 1 | 21.3 |
| LiSt | 3.4 |
| PMA | 34.8 |

Example 1

Figure 4:
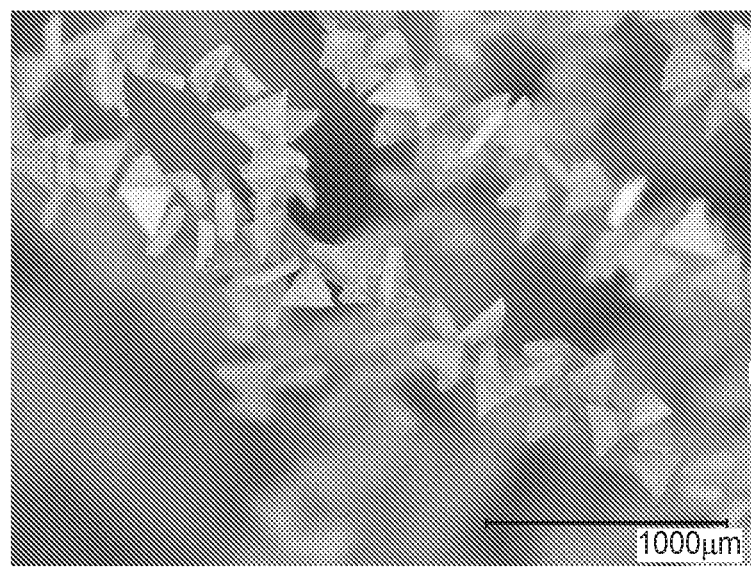
FIG. 4 is a photomicrograph of a particle loaded nonwoven nonwoven fibrous prepared in accordance with Example 1.

The nonwoven web described above was coated with the phenolic resin adhesive with composition shown in Table 3 using a two-roll coater at a dry add-on weight of 78 g/m². Abrasive particles were applied to the coated nonwoven web using an apparatus consisting of a particle feeding system (hopper and conveyor belt), a metal screen (US Standard Mesh 16), and a metal plate located beneath the web conveyor belt as shown in FIG. 1. The distance between the screen and the web conveyor belt was 2 inches (5.08 centimeters). A voltage of +20 kilovolts was applied to the screen using a FR SERIES DC POWER SUPPLY UNIT (obtained from Glassman High Voltage, Inc., High Bridge, N.J.). About 872 g/m² of abrasive particles were applied to the resin-coated nonwoven web which was moving at a speed of 5 feet per minute (1.52 m/min). The composition was then cured at 320° F. (160° C.) for 11.25 minutes. The cured web was evaluated for particle orientation using the Orientation Test. The results showed that about 68% of the particles were radially oriented relative to a fiber surface. A representative image of the Example is shown in FIG. 4.

TABLE 3

| Component | Weight % |
| --- | --- |
| Li | 50.80 |
| PME | 0.93 |
| Resin 2 | 42.35 |
| SR | 1.72 |
| FS | 1.00 |
| S1 | 0.32 |
| CaCO$_3$ | 2.88 |

Example 2

The pre-bonded nonwoven web described above was coated with the phenolic resin adhesive with composition shown in Table 3 using a two-roll coater at a dry add-on weight of 78 g/m².

Figure 5:
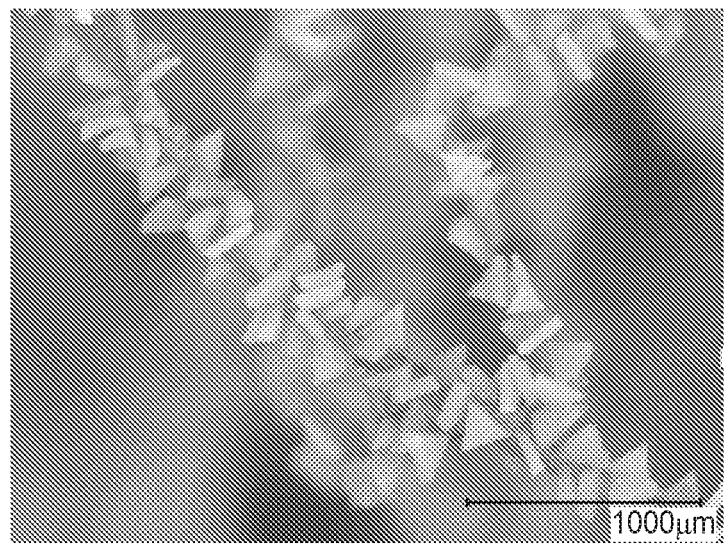
FIG. 5 is a photomicrograph of one side of a particle loaded nonwoven nonwoven fibrous prepared in accordance with Example 2.
Figure 6:
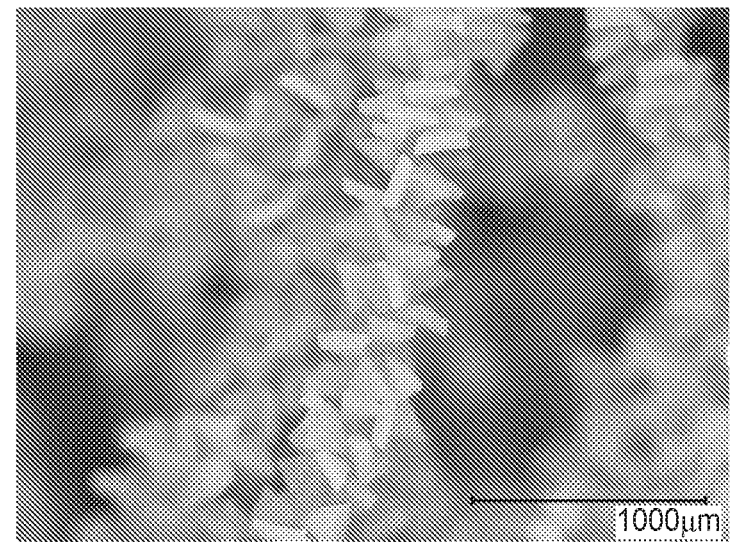
FIG. 6 is a photomicrograph of the reverse side of the particle loaded nonwoven nonwoven fibrous of FIG. 5.

Abrasive particles were applied to the coated nonwoven web using particle dispensing apparatus as shown in FIG. 2. The upper first electrode is a metal screen (a metal screen (US Standard Mesh 16). The distance between screen electrode and the web conveyor belt was 2 inches (5.08 centimeters). A voltage of +20 kilovolts was applied to the screen electrode using a FR SERIES DC POWER SUPPLY UNIT (obtained from Glassman High Voltage, Inc., High Bridge, N.J.), while a voltage of −20 kilovolts was applied to the bottom first electrode located beneath the bottom mineral conveyor belt. Two second electrodes were ground metal plates. About 872 g/m² of SAP were applied from above to the resin-coated nonwoven web which was moving at a speed of 5 feet per minute (1.52 meter per minute). About 1046 g/m² of SAP were applied to the resin-coated nonwoven web from below. The composition was then cured at 320° F. (160° C.) for 11.25 minutes. The cured web was evaluated for particle orientation using the Orientation Test. The results showed that on the top side of the web about 75% of the particles were radially oriented relative to a fiber surface. On the bottom side of the web, about 75% of the particles were radially oriented relative to a fiber surface. A representative image of the top-side of Example 2 is shown in FIG. 5, and the bottom-side of Example 2 is shown in FIG. 6.

Example 3

The pre-bonded nonwoven web described above was coated with the phenolic resin adhesive with composition shown in Table 3 using a hand-held spray bottle and hand-held roller at a dry add-on weight of 118 g/m². SAP was applied to the coated nonwoven web using particle dispensing apparatus as shown in FIG. 3. The distance between the coated web and the abrasive particles on the bottom conveyor was 1.75 inches (4.45 centimeters). The distance between the coated web and the abrasive particles on the upper conveyor was 3.75 inches (9.53 centimeters). The web was static during mineral coating. A voltage of +32.5 kilovolts was applied to the upper electrode while a voltage of −25 kilovolts was applied to the bottom electrode. The mineral bed thickness of SAP was approximately 10 mils (0.254 millimeters). The mineral feed rate of SAP was approximately 1.13 grams per second. The composition was cured at 350° F. (177° C.) for 3 minutes. The cured web was evaluated for particle orientation using the Orientation Test.

Figure 7:
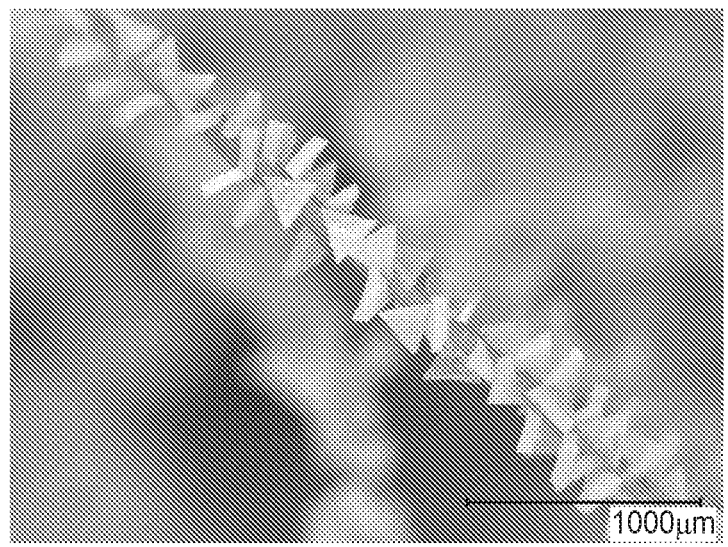
FIG. 7 is a photomicrograph of one side of a particle loaded nonwoven nonwoven fibrous prepared in accordance with Example 3.
Figure 8:
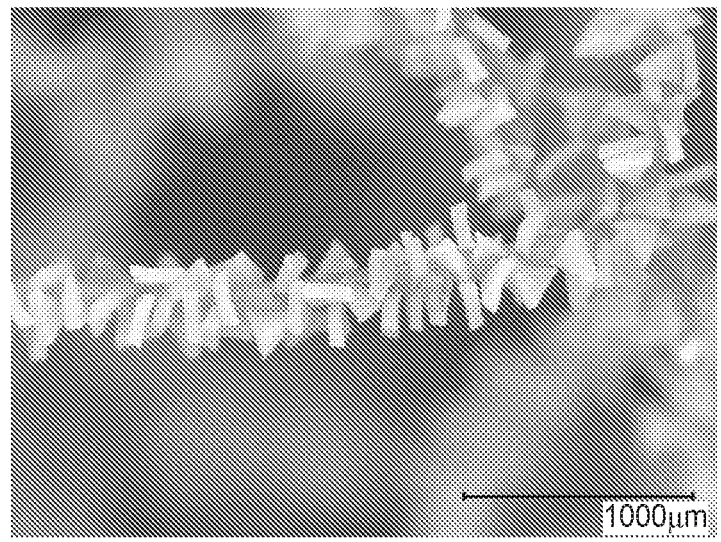
FIG. 8 is a photomicrograph of the reverse side of the particle loaded nonwoven nonwoven fibrous of FIG. 7.

The results showed that on the top side of the web about 77% of the particles were radially oriented relative to a fiber surface. On the bottom side of the web, about 84% of the particles were radially oriented relative to a fiber surface. A representative image of the top-side of Example 3 is shown in FIG. 7. A representative image of the bottom-side of Example 3 is shown in FIG. 8.

Example 4

The procedure of Example 2 is followed except that both first electrodes are charged to +10 kilovolts and both second electrodes are charged to −10 kilovolts.

Example 5

The procedure of Example 3 is followed except that the first electrode is a metal screen positioned above the second electrode.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. An abrasive article, comprising:
 a nonwoven fibrous substrate comprising a plurality of fibers; and
 a plurality of shaped abrasive particles, each shaped abrasive particle adhered to a corresponding fiber,
 a binder to adhere the shaped abrasive particles to the plurality of nonwoven fibers, the binder including a resole phenolic resin and an aliphatic tack modifier, the amount of resole phenolic resin includes from 60 to 98 weight percent of the combined weight of the resole phenolic resin and the aliphatic tack modifier;
 wherein each shaped abrasive particle has a length (L) and a width (W) determined in a direction substantially orthogonal to the length, the ratio of the length to the width defining an aspect ratio (L/W) of at least 1.1, further wherein each abrasive particle is oriented relative to its corresponding fiber, additionally wherein more than 50% of the abrasive particles are oriented with respect to their corresponding fiber such that the abrasive particle length extends generally outwardly away from a surface of the corresponding fiber as determined visually using the Orientation Test.

2. The abrasive article of claim 1, wherein each shaped abrasive particle has the geometric shape of a polygonal prism having two faces and at least three sides thereon.

3. The abrasive article of claim 2, wherein more than 65% of the abrasive particles are oriented with respect to their corresponding fiber such that the abrasive particle length extends generally outwardly away from the surface of the corresponding fiber as determined visually using the Orientation Test.

4. The abrasive article of claim 3, wherein more than 75% of the abrasive particles are oriented with respect to their corresponding fiber such that the abrasive particle length extends generally outwardly away from the surface of the corresponding fiber as determined visually using the Orientation Test.

5. The abrasive article of claim 1, wherein the abrasive particles comprise a sol-gel ceramic, aluminum oxide, zirconium oxide, silicon carbide, silicon nitride, diamond, or a combination thereof.

6. The abrasive article of claim 1, wherein the nonwoven fibrous substrate is prepared using air-laying, melt-blowing, melt-spinning, or a combination thereof.

7. The abrasive article of claim 6, wherein the plurality of fibers comprise (co)polymeric fibers.

8. The abrasive article of claim 1, further comprising a binder to adhere the shaped abrasive particles to the plurality of nonwoven fibers.

9. The abrasive article of claim 1, wherein the plurality of nonwoven fibers are bonded together at a plurality of intersection points between the fibers.

10. A method of forming an abrasive article, comprising:
 providing a nonwoven fibrous substrate comprising a plurality of fibers; conveying the nonwoven fibrous substrate through an electric field;
 coating a binder to the nonwoven fibrous substrate, the binder including a resole phenolic resin and an aliphatic tack modifier, and the amount of resole phenolic resin includes from 60 to 98 weight percent of the combined weight of the resole phenolic resin and the aliphatic tack modifier;
 conveying the nonwoven fibrous substrate through an electric field; and
 applying a plurality of shaped abrasive particles to the nonwoven fibrous substrate while maintaining the electric field, wherein each shaped abrasive particle is adhered to a corresponding fiber, further wherein each shaped abrasive particle has a length (L) and a width (W) determined in a direction substantially orthogonal to the length, the ratio of the length to the width defining an aspect ratio (L/W) of at least 1.1, additionally wherein each abrasive particle is oriented relative to its corresponding fiber, further wherein more than 50% of the abrasive particles are oriented with respect to their corresponding fiber such that the abrasive particle length extends generally outwardly away from a surface of the corresponding fiber as determined visually using the Orientation Test.

11. The method of claim 10, wherein each shaped abrasive particle has the geometric shape of a polygonal prism having two faces and at least three sides thereon.

12. The method of claim 10, wherein more than 65% of the abrasive particles are oriented with respect to their corresponding fiber such that the abrasive particle length extends generally outwardly away from the surface of the corresponding fiber as determined visually using the Orientation Test.

13. The method of claim 12, wherein more than 75% of the abrasive particles are oriented with respect to their corresponding fiber such that the abrasive particle length extends generally outwardly away from the surface of the corresponding fiber as determined visually using the Orientation Test.

14. The method according to claim 10, wherein each shaped abrasive particle is adhered to a corresponding fiber using at least one of a binder, a curable adhesive composition, or thermally-induced bonding to the corresponding fiber.

\* \* \* \* \*